United States Patent
Stifelman et al.

(10) Patent No.: US 10,375,129 B2
(45) Date of Patent: Aug. 6, 2019

(54) FACILITATING CONVERSATIONS WITH AUTOMATED LOCATION MAPPING

(71) Applicant: Microsoft Technology Licensing, LLC, Redmond, WA (US)

(72) Inventors: Lisa Stifelman, Palo Alto, CA (US); Madhusudan Chinthakunta, Saratoga, CA (US); Julian James Odell, Kirkland, WA (US); Larry Paul Heck, Los Altos, CA (US); Daniel Dole, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/307,439

(22) Filed: Jun. 17, 2014

(65) Prior Publication Data
US 2015/0365448 A1    Dec. 17, 2015

(51) Int. Cl.
*G06F 15/16* (2006.01)
*H04L 29/06* (2006.01)
(Continued)

(52) U.S. Cl.
CPC ........ *H04L 65/403* (2013.01); *G06F 11/3086* (2013.01); *G06F 16/444* (2019.01); *G06Q 30/02* (2013.01); *H04L 67/10* (2013.01)

(58) Field of Classification Search
CPC ........ H04L 65/403; H04L 67/10; H04L 51/02
(Continued)

(56) References Cited

U.S. PATENT DOCUMENTS

| 7,917,465 B2 | 3/2011 | Ramamurthi |
| 7,925,716 B2 | 4/2011 | Zhang et al. |

(Continued)

FOREIGN PATENT DOCUMENTS

| CN | 101251853 A | 8/2008 |
| CN | 103092899 A | 5/2013 |

(Continued)

OTHER PUBLICATIONS

"International Search Report & Written Opinion Issued in PCT Application No. PCT/US2015/036066", dated Sep. 10, 2015, 9 Pages.

(Continued)

*Primary Examiner* — Vivek Srivastava
*Assistant Examiner* — Karina J Garcia-Ching

(57) ABSTRACT

Individuals may utilize devices to engage in conversations about topics respectively associated with a location (e.g., restaurants where the individuals may meet for dinner). Often, the individual momentarily withdraws from the conversation in order to issue commands to the device to retrieve and present such information, and may miss parts of the conversation while interacting with the device. Additionally, the individual often explores such topics individually on a device and conveys such information to the other individuals through messages, which is inefficient and error-prone. Presented herein are techniques enabling devices to facilitate conversations by monitoring the conversation for references, by one individual to another (rather than as a command to the device), to a topic associated with a location. In the absence of a command from an individual, the device may automatically present a map alongside a conversation interface showing the location(s) of the topic(s) referenced in the conversation.

20 Claims, 9 Drawing Sheets

(51) Int. Cl.
  *G06F 11/30* (2006.01)
  *H04L 29/08* (2006.01)
  *G06F 16/44* (2019.01)
  *G06Q 30/02* (2012.01)

(58) Field of Classification Search
  USPC .................................................. 709/204, 206
  See application file for complete search history.

(56) References Cited

U.S. PATENT DOCUMENTS

| | | | |
|---|---|---|---|
| 8,037,047 B2 | 10/2011 | Szeto et al. | |
| 8,234,239 B2 | 7/2012 | Ramamurthi | |
| 8,312,380 B2 | 11/2012 | Churchill et al. | |
| 8,483,948 B2 | 7/2013 | Lee | |
| 8,886,655 B1* | 11/2014 | Nandy | G06F 17/30994 |
| | | | 707/749 |
| 8,990,344 B2* | 3/2015 | Ganesh | G06Q 30/0261 |
| | | | 709/206 |
| 9,374,327 B2* | 6/2016 | Rao DV | H04L 12/1827 |
| 2006/0129455 A1 | 6/2006 | Shah | |
| 2007/0281689 A1 | 12/2007 | Altman et al. | |
| 2007/0288164 A1 | 12/2007 | Gordon et al. | |
| 2008/0201434 A1 | 8/2008 | Holmes et al. | |
| 2008/0249778 A1* | 10/2008 | Barton | H04L 51/04 |
| | | | 704/270 |
| 2009/0063439 A1* | 3/2009 | Rauser | G06Q 30/02 |
| 2009/0319917 A1* | 12/2009 | Fuchs | G06Q 10/107 |
| | | | 715/753 |
| 2010/0100809 A1* | 4/2010 | Thomas | H04Q 3/0062 |
| | | | 715/235 |
| 2012/0253788 A1 | 10/2012 | Heck et al. | |
| 2012/0254227 A1 | 10/2012 | Heck et al. | |
| 2013/0218897 A1 | 8/2013 | Palay | |
| 2013/0226453 A1 | 8/2013 | Trussel et al. | |
| 2013/0226690 A1* | 8/2013 | Gross | G06F 17/30861 |
| | | | 705/14.41 |
| 2013/0227017 A1 | 8/2013 | Gahlings | |
| 2013/0326425 A1* | 12/2013 | Forstall | G01C 21/3638 |
| | | | 715/851 |
| 2014/0164533 A1* | 6/2014 | Lynch | H04L 51/046 |
| | | | 709/206 |

FOREIGN PATENT DOCUMENTS

| | | |
|---|---|---|
| CN | 103377276 A | 10/2013 |
| GB | 2452625 A | 3/2009 |
| JP | 2004078676 A | 3/2004 |

OTHER PUBLICATIONS

"MAPCHAT", Retrieved on: Sep. 3, 2013, pp. 1, Available at: http://mapchat.ca/.

"BuddySpace", Published on: Dec. 18, 2008, pp. 3, Available at: http://projects.kmi.open.ac.uk/buddyspace/.

"MindMeld API", pp. 1, Feb. 20, 2012, http://www.expectlabs.com/.

Vilhjalmsson, Hannes Hogni , "Avatar Augmented Online Conversation"—Published Date: Jun. 2003-## Proceedings: In Doctoral Dissertation, Massachusetts Institute of Technology, pp. 206 http://alumni.media.mit.edu/~hannes/thesis/vilhjalmsson_phdthesis.pdf.

PCT Second Written Opinion in PCT/US2015/036066, dated May 18, 2016, 5 pages.

"International Preliminary Report on Patentability Issued in PCT Application No. PCT/US2015/036066", dated Sep. 16, 2016, 6 Pages.

"First Office Action and Search Report Issued in Chinese Patent Application No. 201580032645.6", dated Jan. 28, 2019, 20 Pages.

* cited by examiner

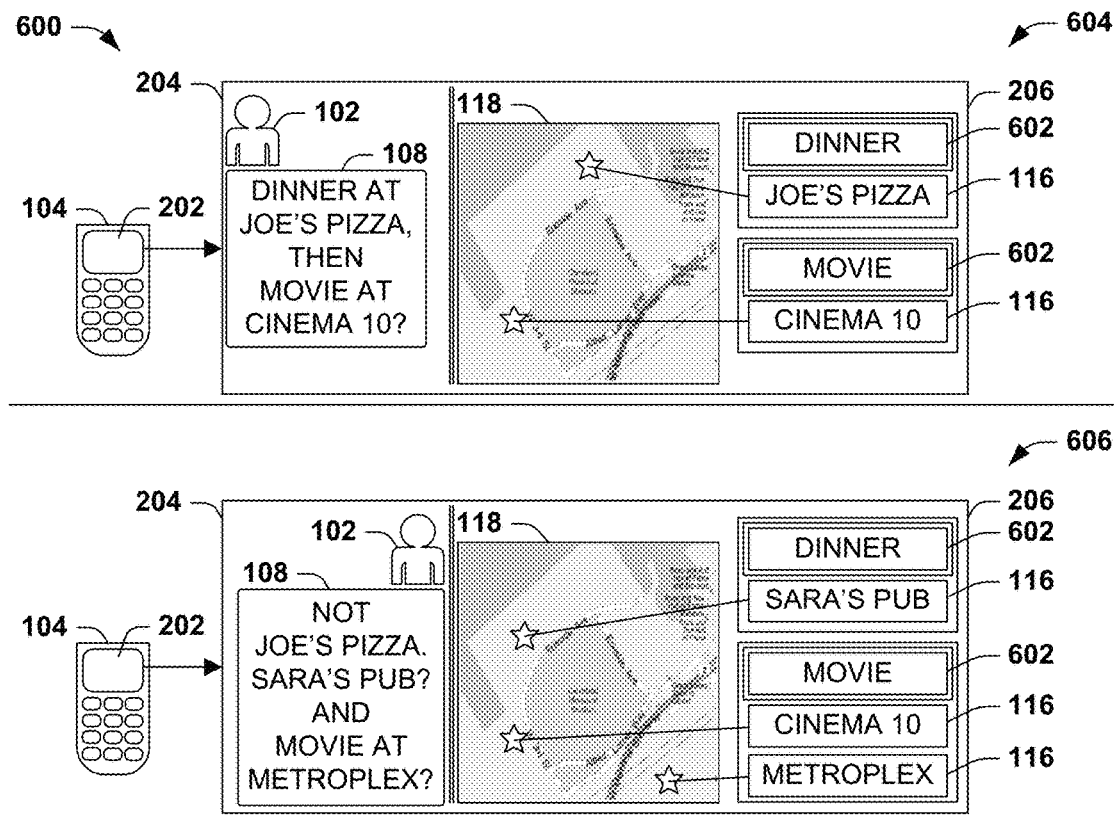
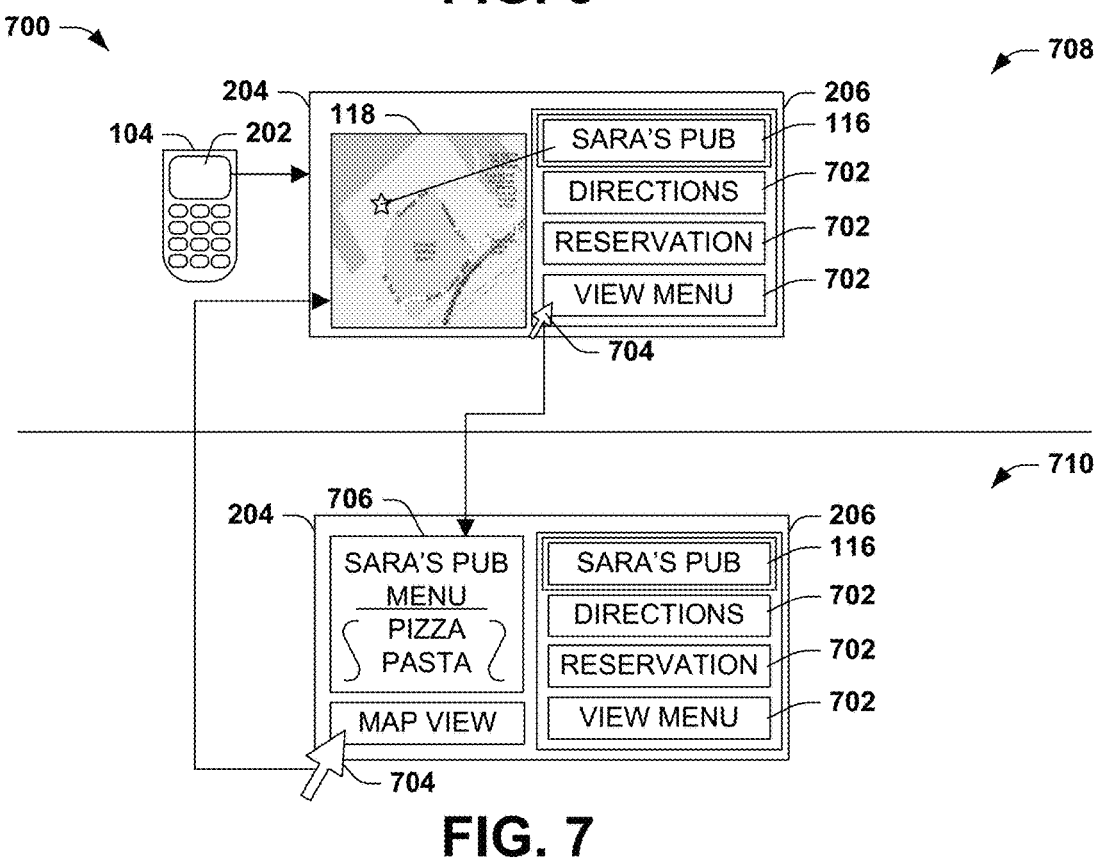
FIG. 6
FIG. 7

FACILITATING CONVERSATIONS WITH AUTOMATED LOCATION MAPPING

BACKGROUND

Within the field of computing, many scenarios involve a conversation among two or more individuals about one or more topics that are associated with a location, such as plans to meet at a restaurant for dinner or to attend a film at a theater. In such scenarios, an individual who is also using a device may alternate between conversing with one another and with interacting with a device to identify, explore, and select the location-based topics. Devices may provide a variety of tools that may facilitate such conversations, such as applications for identifying or recommending topics based on a set of search criteria, such as an events guide application or a restaurant recommendations application; applications for viewing details about a topic, such as viewing restaurant menus and availability for reservations; applications for initiating transactions with a location-based topic, such as making a reservation at a restaurant or purchasing tickets to a theater or music concert; applications for identifying discounts on such and applications for logging the presence of the user at the location of a topic, such as a "check-in" application enabling a user to inform social contacts of their presence at a particular event or location; applications for finding discounts on topics, such as discounted theater tickets and restaurant coupons; and applications for presenting maps and identifying routes to reach the locations of the respective topics.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Many devices may provide a variety of tools that may facilitate users in conversations involving location-based topics. However, in order to use these tools, a user may have to direct his or her attention, alternatively, to the other individuals involved in the conversation and to directing commands at the device to invoke such tools. For example, a set of users may agree to have dinner together; request a device to provide a list of nearby restaurants; discuss the options with each other; request the device to provide more information about a restaurant, such as a menu or a location; discuss and agree on a selected restaurant; and then request the device to plot a route from a current location to the location of the selected restaurant. In this manner, the users may utilize their devices to facilitate the conversation of location-based topics.

While the tools provided by such devices may significantly facilitate the conversation, it may be appreciated that the alternatively directed attention of the users may also impair the conversation. For example, a user who is interacting with a device to retrieve such information may miss part of the conversation. Additionally, sharing such information among users may be difficult; e.g., a first user may use a recommendations application to search for location-based topics of interest, but may have to relate the identified options to a second individual through the conversation, rather than enabling the second individual to view the same options as presented to the user of the device.

Presented herein are techniques for configuring devices to facilitate conversations about location-based topics. In an embodiment of these techniques, a device may be configured to monitor a conversation among at least two individuals to detect topics referenced by an individual. Upon detecting a topic referenced by a first individual to a second individual of the conversation, where the topic is associated with a location and is not referenced as a command to the device, the device may identify the location of the topic, and present on the display a map indicating the location of the topic. In particular, the map may be presented alongside the conversation, such as adjacent to a text-based conversation (e.g., a textual conversation, a verbal conversation that is automatically translated into text, or a video conversation where speech and/or nonverbal communication are automatically translated into text), a map may be presented that automatically displays the locations of topics referenced within the conversation by the individuals. In further embodiments, a device may maintain a list of the topics referenced in the conversation; may automatically suggest topics for the conversation (e.g., presenting a set of recommendations for restaurants that are compatible with the dietary preferences specified in the social profiles of the individuals, and that are near the current locations of the individuals); may allow individuals to alter the list; and may synchronize the presentation of the list with a second device of a second individual, thereby enabling the individuals to review the options together. These and other variations in the presentation of location-based topics in furtherance of a conversation among the individuals may be achievable in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 6 is an illustration of an exemplary scenario featuring a grouping of topic groups referenced within a conversation among two individuals in accordance with the techniques presented herein.

FIG. 7 is an illustration of an exemplary scenario featuring a viewing of information about a location-based topic referenced in a conversation among at least two individuals in accordance with the techniques presented herein.

DETAILED DESCRIPTION

Figure 1:
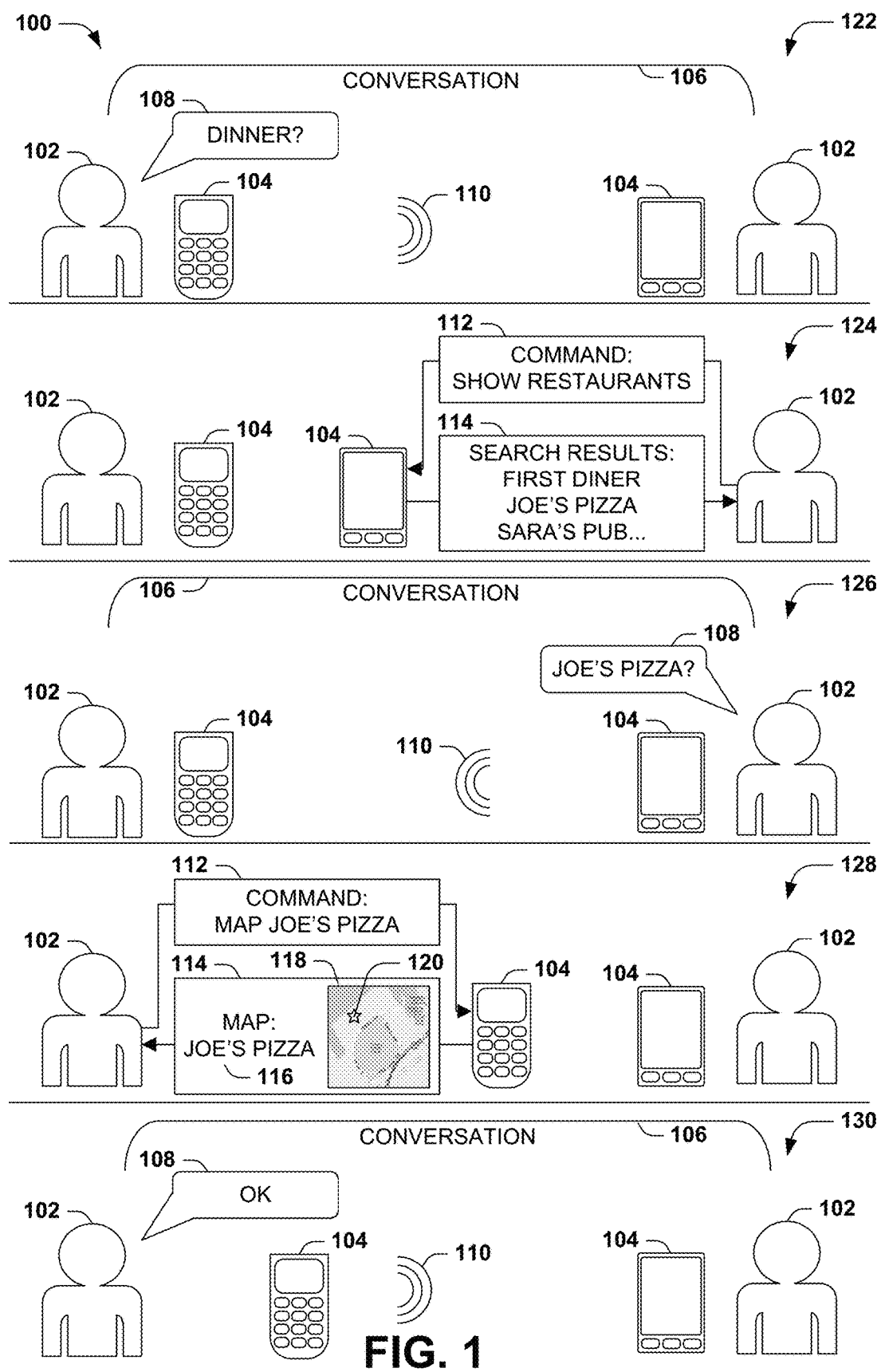
FIG. 1 is an illustration of an exemplary scenario featuring a conversation among two individuals about a set of location-based topics.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an exemplary scenario 100 featuring a conversation among a set of individuals 102 using a pair of devices 104 to engage in a conversation 106 that includes references to topics that are associated with a location.

In this exemplary scenario 100, at a first time point 122, a first individual 102 uses a first device 104 to express a first message 108, indicating an invitation to a second individual 102 to join the first individual 102 for dinner. The first device 104 transmits 110 the first message 108 to a second device 104 operated by the second individual 102, who receives the first message 108 and begins to consider the options for dinner.

At a second time point 124, the second individual 102 momentarily withdraws from the conversation 106 in order to direct a command 112 to the second device 104, e.g., a request to present a list of restaurants in the area of the second individual 102. The second device 104 presents a set of search results 114, and the second individual 102 provisionally selects a restaurant to suggest to the first individual 102.

At a third time 126, the second individual 102 returns to the conversation 106 and expresses a second message 108, indicating a suggestion of a restaurant. The second device 104 transmits 110 the second message 108 to the first device 104, which presents the second message 108 to the first individual 102.

At a fourth time 128, the first individual 102 momentarily withdraws from the conversation 106 to investigate the restaurant referenced in the second message 108 from the second individual 102. The first individual 102 directs a command 112 to the first device 104 to show a location map including a location 120 associated with the topic 116 of the second message 108 (e.g., the street address of the restaurant). The first device 104 therefore presents to the first individual 102 a mapping application 114, including a map 118 that depicts the location 120 of the topic 116 in relation to the first individual 102.

At a fifth time point 130, the first individual 102 determines that the restaurant suggested by the second individual 102 is acceptable, and returns to the conversation 106 to create a third message 108 directed to the second individual 102. The first device 104 of the first individual 102 transmits 110 the third message 108 to the second individual 102 to complete the conversation 106. In this manner, the devices 104 of the individuals 102 facilitate the conversation 106 by presenting information about the topics 116 and the locations 120 associated therewith.

B. Presented Techniques

The exemplary scenario 100 of FIG. 1 provides examples of the manner in which devices 104 may facilitate a conversation 106 among at least two individuals 102 involving topics 116 that are associated with locations 120 (e.g., restaurants for which a street address or geopositioning coordinate may be identified). However, in the exemplary scenario 100 of FIG. 1, several aspects of this interaction may be disadvantageous to one or both individuals 102.

As a first example, each individual 102 utilizes a device 104 to retrieve information about the topics 116 referenced in the conversation 106 by directing a command 112 to the device 104. However, doing so diverts the attention of the individual 102 from the conversation 106 to the device 104 in order to initiate the command 112 and to view the provided information. During this period of diversion, the individual 102 may miss parts of the conversation; e.g., at the fourth time point 128, while the first individual 102 is examining the map 118 of the location 102 of the restaurant, the second individual 102 may not be aware that the first individual 102 has momentarily withdrawn form the conversation 106. The second individual 102 may therefore continue speaking, and the first individual 102 may not hear the second individual 102, resulting in miscommunication. Alternatively, the first individual 102 may instruct the second individual 102 to wait while the first individual 102 examines the map 118, causing a disruptive delay in the conversation 106 that may frustrate the second individual 102.

As a second example, while one individual 102 is using a device 104 to view information that is pertinent to the conversation 106, the other individual 102 is unable to view the same information. Rather, each individual 102 individually views the information, and then creates a message 108 relaying the information to the other individual 102. This exchange of information may be inefficient and/or time-consuming. For example, the first individual 102 executes a query, views some information, and then creates a message 108 conveying some details the second individual 102. The second individual 102 then re-inputs the same query in order to review the same information. Thus, while each device 104 assists one of the individuals 102, the devices 104 do not interoperate to share the information with the other individual 102; rather, the individuals 102 convey such information through the exchange of manually created messages 108.

As a third example, the exchange of information through messages 108 may result in a variety of communication errors. For example, the first device 104 of the first user 102 may fulfill the command 112 to view a map to "Joe's Pizza" by searching for and finding a restaurant matching the specified name. However, this restaurant may differ from the restaurant being displayed on the second device 104 of the second user 102. Thus, the individuals 102 may exchange messages 108 agreeing to meet at a particular location 120, but may inadvertently be referring to different locations presented by the devices 104. These and other disadvantages may arise from the manner in which the individuals 102 and devices 104 interact in the exemplary scenario 100 of FIG. 1.

Presented herein are techniques for alternatively configuring a device 104 to facilitate a conversation 106 among at least two individuals 102 involving a topic 116 that is associated with a location 120. In accordance with these techniques, rather than waiting for a command 112 from an individual 102 to present information about a topic 116 while the individual 102 engages in the conversation 106, a device 104 may monitor the conversation 106 to detect a reference from a first individual 102 to a second individual 102 within the conversation 106 that involves a topic 116 associated with a location 120. Notably, the device 104 may detect this reference as part of the conversation 106 among the individuals 102, e.g., in a message 108 written by the first individual 102 and directed to the second individual 102, rather than as a command 112 directed by the individual 102 to the device 104. Upon detecting such a reference, the device 104 may identify the location 120 of the topic 116 (e.g., performing a search of a location database to identify a street address or geolocation coordinate identifying the location 120 of the topic 116). The device 104 may then present to the individual 102 a map 118 indicating the location 120 of the topic. Notably, this map 118 may be presented concurrently with the conversation 106; e.g., a textual conversation interface (such as an exchange of written messages 108, and/or a speech-to-text transcript of a verbal communication) may be presented adjacent to the map 118 indicating the locations 120 of the topics 116 of the conversation 106.

Figure 2:
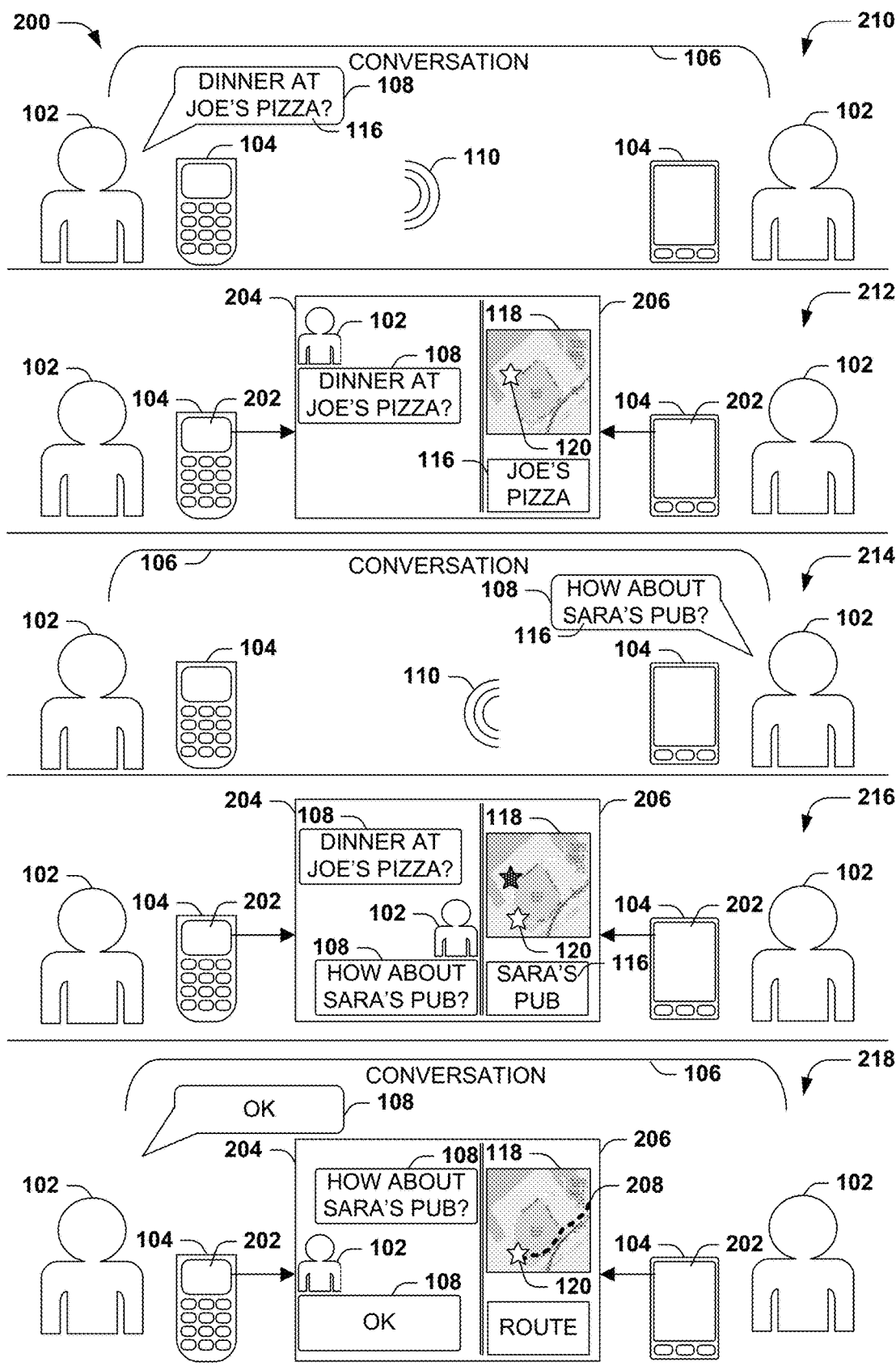
FIG. 2 is an illustration of an exemplary scenario featuring the facilitation of a conversation among two individuals about a set of location-based topics in accordance with the techniques presented herein.

FIG. 2 presents an illustration of an exemplary scenario 200 featuring a pair of devices 104 respectively configured to facilitate a conversation 106 among two individuals 102 in accordance with the techniques presented herein. In this exemplary scenario 200, at a first time point 210, the first individual 102 creates a message 108 to the second individual 102 within the conversation 106, where the first message 108 references a topic 116 that is associated with a location 120 (e.g., a restaurant having a street address). In this exemplary scenario 200, the first individual 102 creates the message 108 by speaking to the first device 104. The first device 104 of the first individual 102 transmits 110 the first message 108 to the second device 104. For example, the first message 108 may be translated by the first device 104 into text, which is transmitted to the second device 104; or, the first device 104 may transmit the first message 108 in verbal form to the second device 104 for presentation to the second individual 102 in verbal form; or, the second device 104 may, upon receiving the verbal first message 108 from the first device 104, translate the verbal message into a text message for presentation to the second user 102. A variety of such techniques may also be utilized, e.g., to present the first message 108 of the first user 102 in both verbal and text form.

As further illustrated in the exemplary scenario 200 of FIG. 2, one or both of the first device 104 and the second device 104 also monitors the conversation 106, and thus detects the reference in the first message 108 to the topic 116 associated with a location 120. For example, the first device 104 and/or the second device 104 may evaluate the first message 108 of the first individual 102, and may detect the mention of the location 120 ("Joe's Pizza"). Such detection may be achieved, e.g., through comparison of the content of the first message 108 with a general set of keywords or key phrases (such as a directory of known locations), and/or a specific set of identifiers (such as locations 120 included in an address book of either individual 102), and/or according to the context of the first message 108 (such as applying lexical analysis to determine that a phrase such as "let's have dinner at . . . " is frequently followed by the name of a restaurant). The first device 104 and/or the second device 104 may also utilize various forms of natural language parsing, such as machine learning techniques that are trained to understand spoken language; dialogue management techniques to determine a particular domain (e.g., a list of places to go); the referenced entities (e.g., relative references to the entities of the conversation, such as "the other one" when discussing two restaurants); the action and/or intent of the participants, such as a consensus for making a reservation; and related attributes, such as ratings, menus, reviews, and hours of operation.

At a second time point 212, the first device 104 presents a conversation interface 204 on a display 202 for the first individual 102 (e.g., a text messaging interface, a transcript of a voice chat such as a telephone call, or a videoconference) that includes the first message 108 of the first individual 102. The second device 104 also presents the conversation interface 204 on a display 202 for the second individual 102 that includes the first message 108 from the first individual 102. In addition, each device 104 presents on the display 202, adjacent to the conversation interface 204, a map interface 206 including a map 118 that depicts the location 120 of the topic 116 referenced in the first message 108. Notably, the map interface 206 is presented by each device 104 in the absence of a command 112 from either individual 102 to present a map 118 or otherwise provide information about the topic 116. Rather, one or both devices 104 has detected the location-based reference in the first message 108, and has automatically inserted the map interface 206 alongside the conversation interface 204. Additionally, both devices 104 automatically present the same location 120 for the topic 116 (e.g., because each device 104 has individually identified the reference to the topic 116 in the first message 108 and the location 120 of the topic 116, and/or because one device 104 has automatically synchronized with the other device 104 to share the information and to coordinate the presentation of the map 118 of the location 120 of the topic 116 to both individuals 102).

At a third time point 214, the second individual 102 presents a second message 108 within the conversation 106 that references a second topic 116. The second device 104 transmits 110 the second message 108 to the first device 104 for presentation to the first individual 102. Again, because one or both devices 104 monitors the conversation 106, and thus detects that the second message 108 references a second topic 116 that is associated with a location 120.

At a fourth time point 216, the conversation interface 204 presented to each individual 102 is updated with the second message 108. Additionally, on one or both devices 104, the location 120 of the second topic 116 is identified, and the map 118 presented on the display 202 alongside the conversation interface 204 is updated to present the location 120 of the second topic 116 as well as the location 120 of the first topic 116. Again, the map interface 206 is updated in the absence of a command 112 from either individual 102 to show the location 120 of the second topic 116; and, again, both devices 104 may update the map 118 either by individually detecting the reference to the second topic 116 and inserting the location 120 of the second topic 116 into the map 118, and/or by synchronizing the presentation to the individuals 102 with the other device 104.

At a fifth time point 218, the first individual 102 and the second individual 102 may conclude the conversation 106 when the first individual 102 sends a third message 108 accepting the suggestion of the second individual 102. One or both devices 104 may detect that the conversation 106 has ended and that the individuals 102 have agreed on a particular topic 116 (e.g., to have dinner together at the restaurant suggested by the second individual 102). Additionally, one or both devices 104 may present on the display 202 a map 118 of the location 120 of the selected topic 116, and well as a route 208 from the current location of each individual 102 to the location 120.

In comparison with the exemplary scenario 100 of FIG. 1, the manner in which the devices 104 facilitate the conversation 106 among the individuals 102, in the exemplary scenario 200 of FIG. 2 may provide some advantages. As a first example, one or both devices 104 provides maps 118 and/or related information (such as routing) about the topics 116 discussed in the conversation 106 automatically by monitoring the conversation 106 and detecting references to such topics 116, rather than in response to a command 112 from an individual 102. Accordingly, both individuals 102 may remain present in and focused upon the conversation 106, rather than upon interacting with the devices 104 to request a retrieval of such information. As a second example, the devices 104 may interoperate to present the same information (e.g., the same location of the same restaurant) at the same time on each device 104 to each individual 102, and without either individual 102 having to convey this information to the other individual 102 (e.g., neither individual 102 has to convey the information presented on one device 104 to the other individual 102, and neither individual 102 has to re-enter information into a device 104 that the other individual 102 already provided to the other device 104). In this manner, the configuration of the devices 202 may facilitate the convenience, efficiency, and/or accuracy of the conversation 106 in accordance with the techniques presented herein.

C. Exemplary Embodiments

Figure 3:
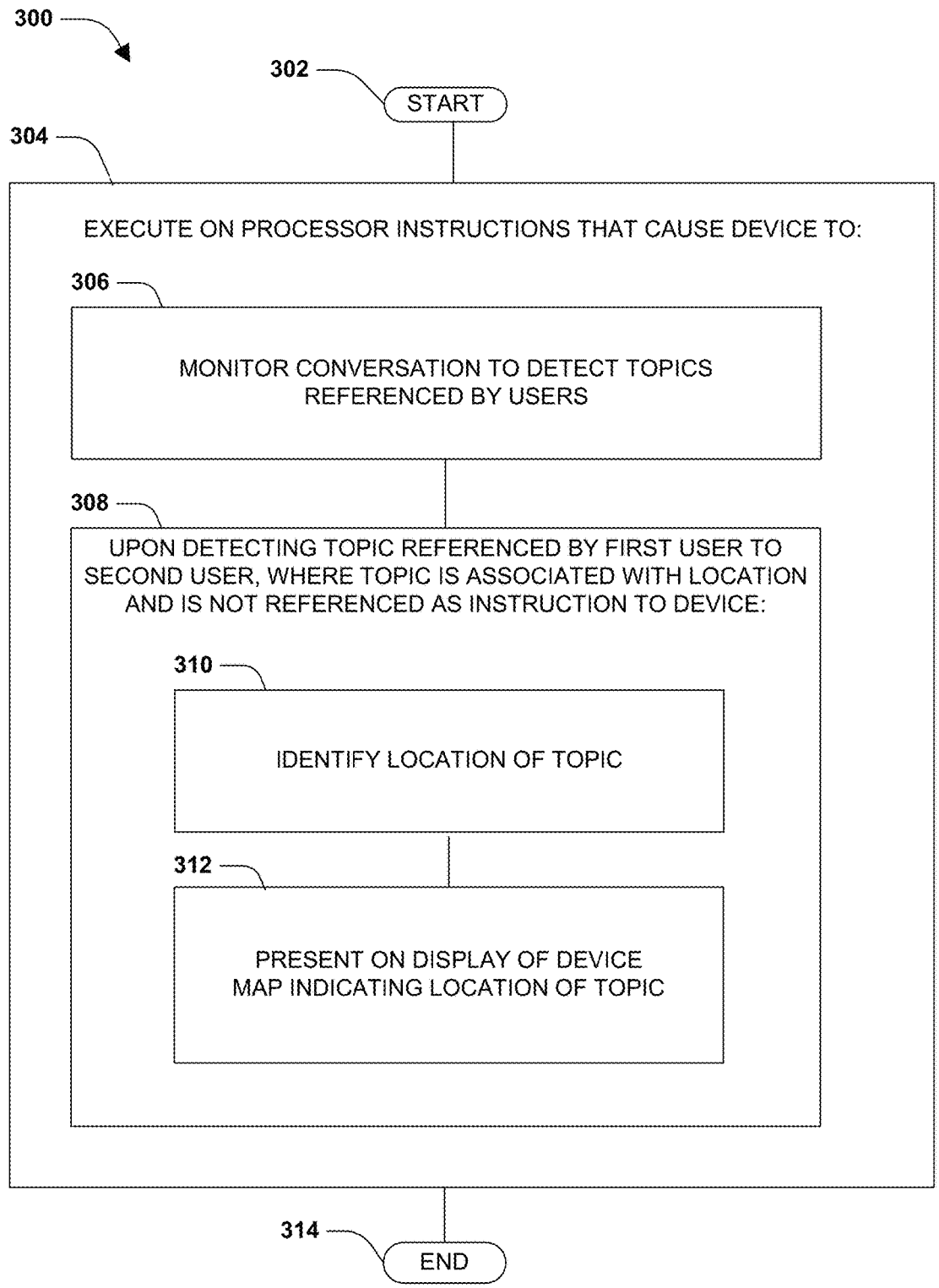
FIG. 3 is an illustration of an exemplary method of facilitating a conversation among at least two users about a topic associated with a location in accordance with the techniques presented herein.

FIG. 3 presents an illustration of an exemplary first embodiment of the techniques presented herein, illustrated as an exemplary method 300 of facilitating a conversation 106 among at least two individuals 102. The exemplary first method 300 may be implemented, e.g., as a set of instructions stored in a memory component (e.g., a memory circuit, a platter of a hard disk drive, a solid-state storage device, or a magnetic or optical disc) of a device 104 having a processor and a display 202, where the instructions, when executed on the processor, cause the device 104 to operate according to the techniques presented herein. The exemplary first method 300 begins at 302 and involves executing 304 the instructions on the processor of the device 104. In particular, the execution of the instructions on the processor causes the device 104 to monitor 306 the conversation 106 to detect topics 116 referenced by an individual 102. The execution of the instructions also causes the device 104 to, upon detecting 308 a topic 116 referenced by a first individual 102 to a second individual 102 of the conversation 106, where the topic 116 is associated with a location 102, and where the topic 116 is not referenced as a command 112 to the device 104, identify 310 the location 120 of the topic 116, and present 312, on the display 202 of the device 104, a map 118 indicating the location 120 of the topic 116. In this manner, the exemplary method 300 enables the device to facilitate the conversation 106 among the individuals 102 in accordance with the techniques presented herein, and so ends at 314.

Figure 4:
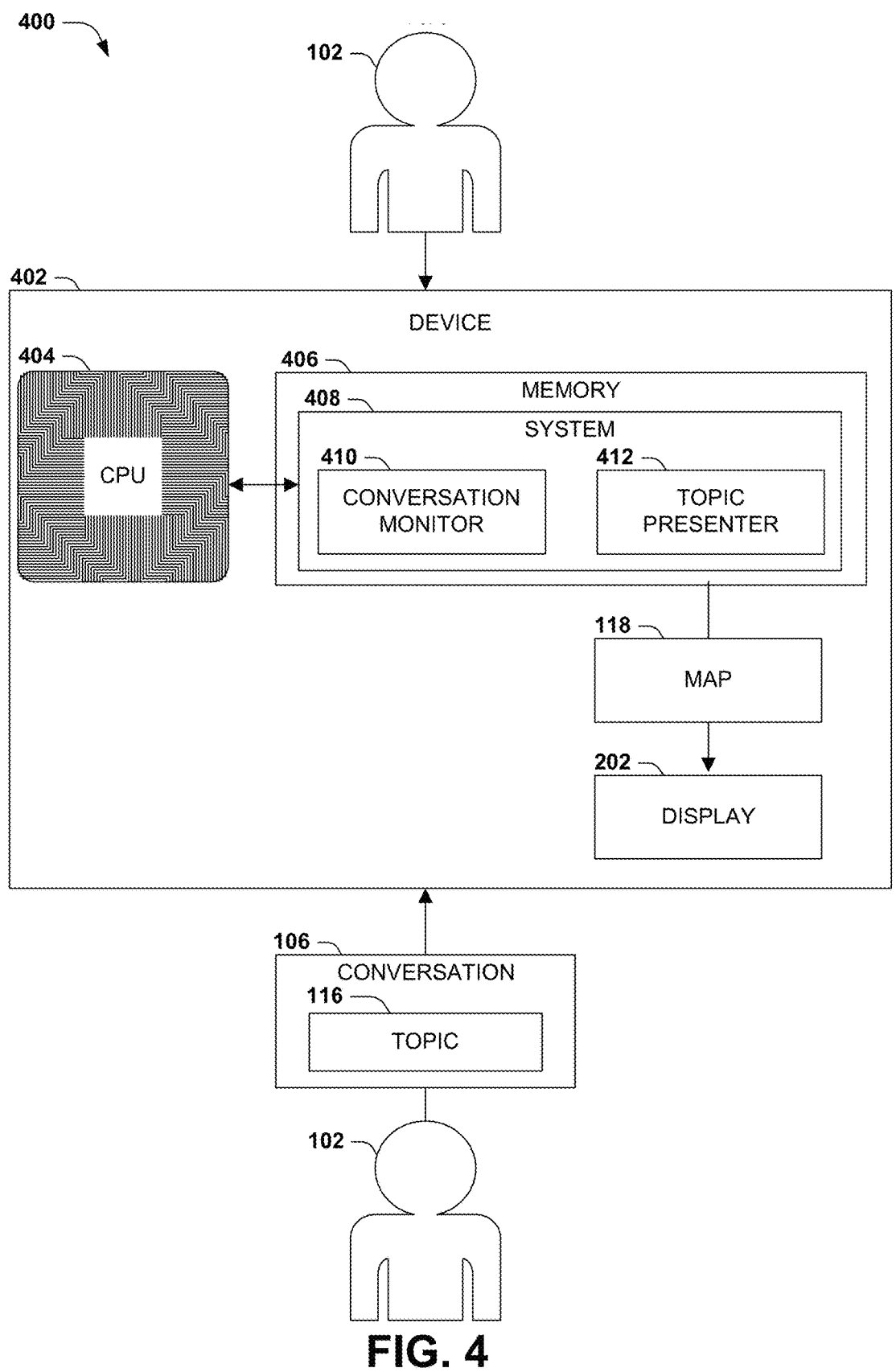
FIG. 4 is a component block diagram illustrating an exemplary system for facilitating a conversation among at least two users about a topic associated with a location in accordance with the techniques presented herein.

FIG. 4 presents an illustration of an exemplary second embodiment of the techniques presented herein, illustrated as an exemplary system 408 for enabling a device 104 to facilitate a conversation 106 among at least two individuals 102. One or more components of the exemplary system 408 may be implemented, e.g., as instructions stored in a memory 406 of the device 402 that, when executed on a processor 404 of the device 402, cause the device 402 to perform at least a portion of the techniques presented herein. Alternatively (though not shown), one or more components of the exemplary system 408 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein. The exemplary system 408 includes a conversation monitor 410 that monitors the conversation 106 to detect topics 116 referenced by an individual 102. The exemplary system 408 also includes a topic presenter 412 that, upon the conversation monitor 410 detecting a topic 116 that is referenced by a first individual 102 to a second individual 102 of the conversation 106, where the topic is associated with a location 102 and is not referenced as a command 112 to the device 402, identify a location 120 of the topic 116, and present, on the display 202, a map 118 indicating the location 120 of the topic 116. In this manner, the interoperation of the components of the exemplary system 406 facilitates the conversation 106 among the at least two individuals 102 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
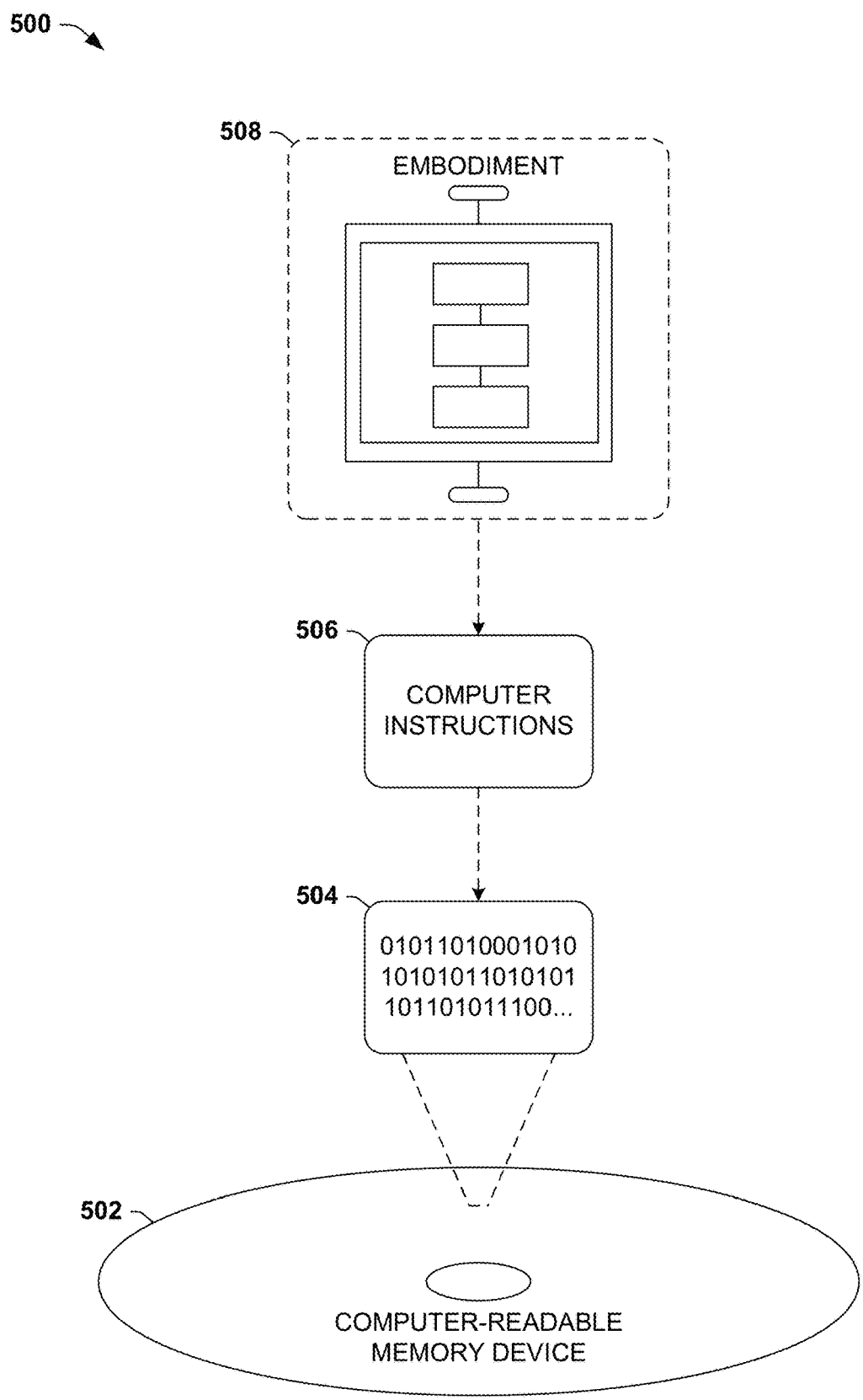
FIG. 5 is an illustration of an exemplary computer-readable medium including processor-executable instructions configured to embody one or more of the provisions set forth herein.

An exemplary computer-readable medium that may be devised in these ways is illustrated in FIG. 5, wherein the implementation 600 comprises a computer-readable memory device 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In a first such embodiment, the processor-executable instructions 506 may be configured to cause a computing device to perform a method of facilitating a conversation 106 among at least two individuals 102, such as the exemplary method 300 of FIG. 3. In a second such embodiment, the processor-executable instructions 506 may be configured to implement one or more components of a system of facilitating a conversation 106 among at least two individuals 102, such as the exemplary system 408 of FIG. 4. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary system 408 of FIG. 4; and the exemplary computer-readable memory device 502 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 104, including workstations; servers; game consoles; laptop and palmtop form factor computers; and mobile devices, such as phones, tablets, texting devices, cameras, portable media players, portable game players, and global positioning system (GPS) receivers. Such techniques may also be provided by as a first device as a service for a second device (e.g., a server and/or client), and/or by an interoperating set of devices (e.g., devices of respective individuals that synchronize and coordinate the presentation of information to the individuals 102). Additionally, one or more devices 104 may be utilized by one of the individuals 102 of the conversation 106, or a device 104 may be utilized by two or more individuals 102 (e.g., passengers in an automobile, or a group of individuals 102 together consulting an information kiosk).

As a second variation of this first aspect, the techniques presented herein may be utilized to facilitate many types of conversations 106. Such conversations may include a variety of modalities, such as an exchange of text messages (e.g., email messages, Simple Message Service (SMS) messages, and/or chat sessions, such as instant messaging scenarios); an exchange of voice communication (e.g., a phone call or voice-over-internet-protocol (VoIP) session); an exchange of images (e.g., a photo exchange service); an exchange of video streams (e.g., a videoconference); and/or an exchange of personal information (e.g., a mutual location sharing application). In some such scenarios, different individuals may participate in different modalities (e.g., a first individual 102 may generate text messages, while a second individual 102 may generate a voice stream). A device 104 of an individual 102 may therefore provide an asymmetric, mixed-modality communication session, and/or may translate from a first modality to a second modality (e.g., translating an incoming voice stream into a textual transcript, such as by using a speech-to-text interpreter). Alternatively or additionally, a particular individual 102 in the conversation may only send or only receive messages (e.g., a passive listener of the conversation 106). Alternatively or additionally, each device 104 may be utilized by one individual 102, or by a group of two or more individuals 102 participating collectively in the conversation 106. As a further variation, a conversation server that interoperates with one or several devices 104 to facilitate the conversation between the individuals 102 may perform all or some of the monitoring, detecting, identifying, and/or presenting involved in the techniques presented herein.

As a third variation of this first aspect, the techniques presented herein may be utilized to facilitate many types of conversations 106. In some such scenarios, translation may be performed (e.g., translating a first language of a first individual 102 to a second language of a second individual 102, or translating from a native language of a first individual 102 to an accessibility language understood by a second individual 102, such as Braille). Alternatively or additionally, such conversations 106 may include references to many types of topics 116 associated with a location 120, such as a residence of an individual 102 (including an individual 102 participating in the conversation 106); a business (e.g., a restaurant, a theater, or an office); an event (e.g., a concert or site of a news story); and/or an individual (e.g., the current location of an individual 102 of the conversation 106). In some variations, the conversation between the individuals 102 may be asynchronous, such as an exchange of text or email messages, and the evaluation of such messages to identify referenced locations 120 may be performed in a non-realtime manner. In other scenarios, the conversation between the individuals 102 may be fluid and realtime, such as a telephone call or videoconference, and respective devices 104 may perform the evaluation of messages 108 in a realtime or near-realtime manner concurrently with the conversation, which may enable a rapidly responsive updating of a map to reflect the topics and locations 120 currently being discussed by the individuals 102. Many such scenarios may be devised where the techniques presented herein may be advantageously utilized.

D2. Detecting and Tracking Referenced Topics

A second aspect that may vary among embodiments of the techniques presented herein relates to the manner of identifying topics 116 referenced within the conversation 106, and of tracking such topics 116 through the conversation.

As a first variation of this second aspect, a device 104 may monitor the conversation 106 to detect references to topics 116 in various ways. As a first such example, the device 104 may comprise a set of recognizable keywords or phrases, such as the names of restaurants in the area of one or more individuals 102 of the conversation 106, and may detect instances of these keywords for phrases in the messages 108 of the conversation 106. Such keywords or phrases may include, e.g., the names of locations 120 where one or more of the individuals 102 has recently and/or frequently visited, and/or the names of locations 120 that are associated with a calendar event for one or more of the individuals 102. Such keywords and/or phrases key may also be drawn from data sources that are particular to the individuals 102, such as those associated with locations 120 that are near the current location of one or more individuals 102, and/or an address book or travel history of one or more individuals 102. As another example, such keywords may comprise the names of locations 120 that are of high and/or trending popularity in the vicinity of one or more of the individuals 102, and/or among contacts of one or more of the individuals 102 within a social network or an institution. As a further variation, such concepts may be selected from two or more individual profiles of the individuals 102 of the conversation, such as including a second individual profile of a second individual 102 of the conversation.

As a second such example of this first variation of this second aspect, the device 104 may utilize a natural-language parsing technique to detect the references, such as linguistic structure and conversational patterns (e.g., phrases such as "meet me at [name of location]" and "let's visit [name of location]" indicating the name of a referenced location). As a third such example, the device 104 may utilize metadata, such as a hashtag or hyperlink inserted by a user 102 into a message 108 that identifies a topic 116 having a location 120. As a fourth such example, the device 104 may analyze the conversation 106 with a machine learning evaluation technique, such as an artificial neural network that has been trained to recognize topics 116 arising within conversations 106. Such machine-learning evaluation techniques may involve, e.g., identifying the domain of the conversation, including the topics 116 and/or locations 120 that are associated with such domains (e.g., conversations about meals, which frequently involve references to restaurant locations 120, vs. conversations about social plans, which frequently involve references to locations 120 such as movie theaters and concert halls). The first device 104 and/or the second device 104 may also utilize various forms of natural language parsing, such as machine learning techniques that are trained to understand spoken language; dialogue management techniques to determine a particular domain (e.g., a list of places to go); the referenced entities (e.g., relative references to the entities of the conversation, such as "the other one" when discussing two restaurants); the action and/or intent of the participants, such as a consensus for making a reservation; and related attributes, such as ratings, menus, reviews, and hours of operation.

As a second variation of this second aspect, in addition to identifying the topics 116 of the conversation 106, a device 104 may track a set of one or more topic groups arising within the conversation 106 that are respectively associated with at least one topic 116. For example, the individuals 102 may discuss a set of evening plans, including (as a first topic group) restaurants where the individuals 102 may meet for dinner, and (as a second topic group) locations to view a film following dinner. As the individuals 102 reference and discuss the topics 116, in addition to identifying the topics 116 and presenting a map 118 indicating the locations 120 of the topics 116, a device 104 may group the list of topics 116 into topic groups, thereby facilitating an organized summary of the conversation 106. For example, a topic presenter may, upon detecting a topic 116 referenced by a first individual 102 to a second individual 102 of the conversation 106, identify a selected topic group of the conversation 106 that is associated with the topic 116, and store the topic 116 in the conversation topic set, where the storage associated the topic 116 with the selected topic group. The device 104 may also present, on the display 202, a list comprising at least two topic groups, and the topics 116 of the conversation 106 that are associated with the respective topic groups.

As a third variation of this second aspect, a device 104 monitoring the conversation 106 may track a set of topics 116 referenced by the individuals 102 during the conversation 106. For example, upon detecting a topic 116 referenced by a first individual 102 of the conversation 106, a device 104 may store the topic 116 in a conversation topic set. The device 104 may then present, on the display 202, a list comprising the conversation topic set, and upon receiving from an individual 102 a selection of a selected topic 116 in the list, present on the map 118 the location 120 of the selected topic 116 (e.g., a list of the restaurants discussed by the individuals 102 during a conversation 106 about where to meet for dinner). The device 104 may also detect the selection by an individual 102 of a topic 116 in the list, and may present on the map 118 the location 120 of the selected topic 16. Additionally, the device 104 may persistently store the conversation topic list for later review by the individuals 102. In an embodiment, upon detecting a conversation end, the device 104 stores the conversation topic set; and upon receiving a request from an individual 102 to present the conversation topic set after the conversation end, the device 104 may present, on the display 202, a list comprising the conversation topic set.

In addition to collecting, storing, and presenting the topics 116 of the conversation 106, further variations of this third variation of this second aspect involve altering the list comprising the conversation topic set to reflect the substance of the conversation 106 among the individuals 102. For example, upon receiving a request from an individual 102 to alter the conversation topic set, the device 104 alter the conversation topic set according to the request of the individual 102. Such requests may include, e.g., a request from an individual 102 for a removal of a selected topic 116 from the conversation topic set, such as an expression of disapproval of a topic 116 suggested by another individual 102 of the conversation 106. In addition to removing the topic 116 from the conversation 106, the device 104 may subsequently refrain from presenting the selected topic 116 in the conversation topic set. As a still further variation, one or more individuals 102 within a conversation 106 may be designated as a conversation leader of the conversation 106 (e.g., a moderator of a large group discussion). A device 104 may alter the conversation topic set only in accordance with requests received from a conversation leader, and may refrain from altering the conversation in response to request from individuals 102 who are not a conversation leader of the conversation 106. That is, while many individuals 102 in the discussion may propose the addition and/or removal of topics 116, the device 104 may alter the conversation topic set only when such proposals are accepted by a conversation leader of the conversation 106.

FIG. 6 presents an illustration of an exemplary scenario 600 featuring several of the variations of the second aspect presented herein. In this exemplary scenario 600, at a first time point 604, a first individual 102 in a conversation 106 provides a message 108 referencing two topics 116: the name of a restaurant, and the name of a theater. In view of this message 108, a device 104 may identify a different topic group 602 for each topic 116 (e.g., a "dinner" topic group 602 for topics 116 comprising restaurants, and a "movie" topic group 602 for topics 116 comprising theaters); and upon presenting the conversation interface 204, the device 104 may group the list of topics 116 according to the topic groups 602 of the topics 116. At a second time point 606, a second individual 102 of the conversation 106 may provide a second message 108 declining consideration of a selected topic 116 of the conversation 106, and the device 104 may alter the conversation topic set by removing the selected topic 116 from the list. The second message 108 may also specify an alternative topic 116 for each of the first topic group 602 (e.g., a different place to have dinner) and the second topic group 602 (e.g., a different theater where the individuals 102 may view a film). The device 104 may identify the topic group 602 associated with each topic 116 of the second message 108 (e.g., by referring to a location database to identify the type of location 120 referenced by the topic 116, and/or by evaluating the context of the conversation 106 in which the topic 116 was referenced), and may present the list on the display 202 with the added topics 116 respectively grouped according to the topic group 602 associated with the topic 116. Embodiments may utilize many such variations while identifying and tracking the topics 116 referenced within a conversation 106 in accordance with the techniques presented herein.

D3. Presenting Locations of Conversation Topics

A third aspect that may vary among embodiments of the techniques presented herein involves the manner of presenting to an individual 102 the location(s) 120 of the topic(s) 116 of the conversation 106 on a map 118.

As a first variation of this third aspect, many types of maps 118 may be presented, including an area map, a road map, an aerial map (e.g., a bird's-eye view captured by a satellite of an area including a location 120), a topographical map, and a population or traffic map. The map 118 may also present only one location 120, or the respective locations 120 of two or more topics 116, and/or may also indicate a current or projects location 120 of one or more individuals 102 of the conversation 106.

As a second variation of this third aspect, the map interface 206 may be presented on the display 202 to an individual 102 in various ways. For example, the device 104 may initially refrain from presenting the map 118 in a map interface 206 of the conversation interface 204 before detecting in the conversation 106 at least one reference to a topic 116 that is associated with a location 120. Upon detecting such a reference, the device 104 may insert the map interface 206 into the conversation interface 204, including the map 118 indicating the location 120 of the topic 116. Alternatively or additionally, upon detecting a shift in the conversation 106 away from references to topics 116 associated with locations 120, the device 104 may remove the map interface 206 from the conversation interface 204.

As a third variation of this third aspect, the device 104 may occasionally substitute the presentation of the map 118 of a location 120 with other information about the topic 116 of the location 120. For example, upon receiving from an individual 120 a selection of a selected topic 116 of the conversation 106, the device 104 may replace the map 118 on the display 202 with an information interface describing the topic 106 (e.g., a picture of the location 120 of the topic 116, a menu of a restaurant, or a listing of movies playing at a theater); and upon receiving from an individual 102 a request to return to the map 118, the device 104 may replace the information interface on the display 202 with the map 118. Such information may be retrieved from a variety of sources (e.g., from a web page associated with the topic 106; from a location database or a reviews database; or from an advertiser, such as an advertisement associated with a topic 116 including a discount for the individuals 102, where the advertisement is retrieved and presented with the topic 116 in the map interface 206).

As a fourth variation of this third aspect, the device 104 may present a set of action options for actions that are associated with a topic 116 and/or location 120. The device 104 may therefore identify at least one action that is associated with the topic 106, The device 104 may therefore present on the display 202, associated with the topic 116, an action option to invoke the respective actions; and, upon receiving from an individual 102 a selection of a selected action option for a selected topic 116, invoke the selected action option for the selected topic 116.

FIG. 7 presents an illustration of an exemplary scenario 700 featuring several variations in the presentation, on the display 202 of a device 104, of locations 120 for a selected topic 116 of a conversation 106. In this exemplary scenario 700, at a first time point 708, the device 104 may include in the presentation of the conversation interface 204 (not shown) a map interface 206 that, in addition to indicating the location 120 of the topic 116, presents action options 702 for respective actions that may be invoked in relation to the topic 116. In this exemplary scenario 700, the selected topic 116 comprises a restaurant, and the device 104 identifies and presents action options 702 for actions including plotting a route between a current location of the individual 102 and the location 120; initiating a reservation of a table at the restaurant; and initiating a communication session between the restaurant and the individual 102. If the individual 102 selects 704 an action option 702 offering to show a menu for the restaurant, then at a second time point 710, the display 202 of the device 104 hides the map interface 206 and presents an information interface 706 providing information about the topic 116, i.e., the menu of the restaurant. A user selection 704 of an action option to return to the map causes a removal of the information interface 706 and a second presentation of the map interface 206. In this manner, the presentation of the topic 116 and location 120 may be responsive to user interaction initiated by an individual 102, and may respond accordingly by adjusting the contents of the display 202 of the device 104, in accordance with several variations of this third aspect of the techniques presented herein.

D4. Topic Suggestions

A fourth aspect that may vary among embodiments of the techniques presented herein involves suggested topics 106 for a topic group 602 of the conversation 106. For example, if the conversation 106 of the individuals 102 focuses on where to have dinner, a device 104 may identify at least one suggested topic 116 for the topic group 602, and present the least one suggested topic 116 to the individual 102.

As a first variation of this fourth aspect, suggested topics 116 may be inserted into a conversation 106 in response to various events. As a first such example, suggested topics 116 may be inserted upon detecting a new topic group 602 (e.g., a suggestion from a first individual 102 to a second individual 102 to have dinner somewhere). As a second such example, upon receiving a request for removal of a topic 116 from a topic group 602, a device 104 may identify an alternative topic 116 for the selected topic group 602, and suggest the alternative topic in lieu of the removed topic 116. As a third such example, alternative topics may be identified and suggested if a topic group 602 remains unfilled for at least a threshold duration (e.g., if the individuals 102 are unable to agree on a restaurant after a minute of conversation 106). As a fourth such example, the device 104 may present to an individual 102 an option to identify and present suggested topics 116 for a topic group 602, and may do so upon receiving an activation of the option by the individual 102 (e.g., upon the individual 102 selecting a "suggestions" button).

Figure 8:
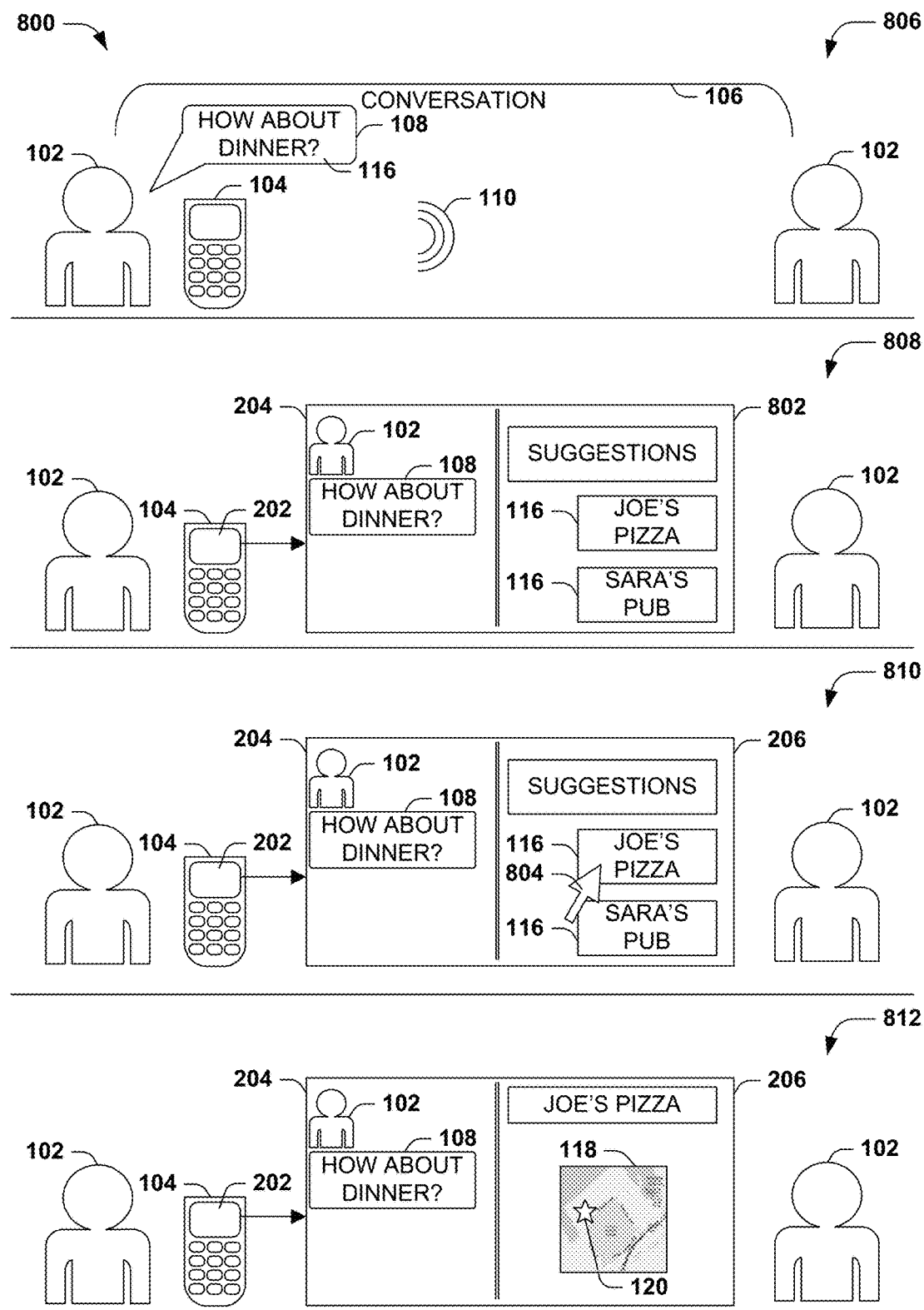
FIG. 8 is an illustration of an exemplary scenario featuring a presentation of recommendations of location-based topics to a user in accordance with the techniques presented herein.

As a second variation of this fourth aspect, suggested topics 116 may be automatically presented by the device 104 to the individual 102. For example, upon detecting a reference to a topic 116, the device 104 may automatically present location-based suggestions on a map 118 without awaiting a request from the individual 102 to do so. Alternatively, and as illustrated in the exemplary scenario 800 of FIG. 8, the suggested topics 116 may be presented in response to input from the individual 102. At a first time point 806, the individuals 102 in a conversation 106 may exchange messages 108 involving a topic 116, and a device 104 may identify one or more suggested topics 116 respectively associated with a location 120. At a second time point 808, the device 104 may present a suggestions pane 802 adjacent to the conversation 110 with a list of suggested topics 116. At a third time point 810, the device 104 may detect user input from the individual 102 comprising a selection 804 of a suggested topic 116, and in response and at a fourth time point 810, the device 104 may present a map interface 206 adjacent to the conversation 110 with a map 118 indicating the location 120 of the suggested topic 116 selected by the individual 102. In this manner, the device 104 may utilize manual user input in the presentation of the suggested topics 116 to the individual 102.

As a third variation of this fourth aspect, suggested topics 116 may be integrated with at least one topic 116 referenced by an individual 102 of the conversation 106 in various ways. For example, the suggested topics 116 may be presented in a different area of the map interface 206 than the topics 116 referenced by the individuals 102 (e.g., a "referenced restaurants" list and a "suggested restaurants" list). Alternatively, the suggested topics 116 may be presented together with the topics 116 referenced by the individuals 102, e.g., as a mixed list, optionally with the suggested topics 116 presented in a different visual manner than the topics 116 referenced by the individuals 102 of the conversation 106.

As a fourth variation of this fourth aspect, suggested topics 116 may be identified in a variety of ways. As a first such example, at least one individual 102 may identify at least one topic group constraint for a topic group 602 (e.g., for the topic group of restaurants, an individual 102 may specify a preference for a particular type of food), and the device 104 may identify only suggested topics that satisfy the topic group constraints of the topic group 602. As a second such example, a device 104 may refer to an individual profile of at least one individual 102 in the conversation 106, and may identify suggested topics that are consistent with the individual profile (e.g., restaurants that are consistent with dietary restrictions of the individual 102 specified in the individual profile, or restaurants where the individual profile indicates that the individual 102 has previously visited and enjoyed). If a plurality of suggested topics 116 are available for presentation, a device 104 may calculate, for each suggested topic, a suggested topic score associating the suggested topic 16 with the topic group constraints of the topic group 602, and may present the suggested topics 602 sorted according to the suggested topic scores. In some scenarios, the identification of suggested topics 116 may be difficult, e.g., if individuals 102 in the conversation 106 have conflicting preferences or restrictions, and the device 104 may have to select suggested topics as a consensus among the individuals 102.

Figure 9:
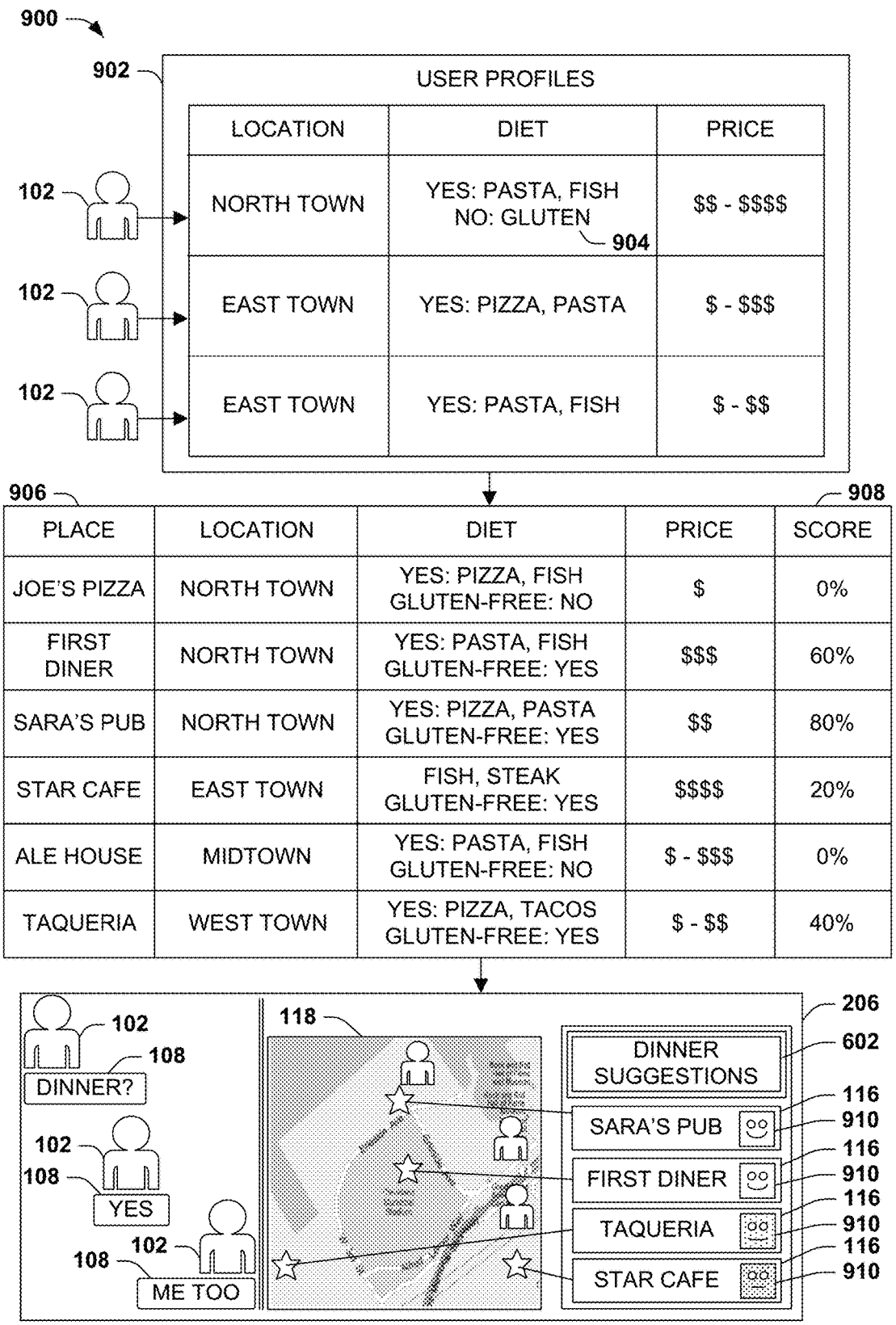
FIG. 9 is an illustration of an exemplary scenario featuring a recommendation of location-based topics for a conversation among at least two individuals in accordance with the techniques presented herein.

FIG. 9 presents an illustration of an exemplary scenario featuring a presentation of suggested topics to individuals 102 in view of several of the variations of this fourth aspect. In this exemplary scenario 900, a set of individuals 102 are having a conversation 106 about where to meet for dinner. A device 104 of an individual 102 may have access to an individual profile 902 for each individual 102, where the individual profile 902 specifies a location 120 of the individual 102 (e.g., a current location of the individual 102, or a projected location 102 of the individual 102 prior to a selected meeting time); a set of specified dietary preferences and dietary restrictions; and a price range preference. The details of the individual profiles 902 may be regarded by the device 104 as topic group constraints 904 for a "dinner restaurants" topic group 602. The device 104 may also have access to a topic database 906, such as a restaurant database providing various details about the restaurants. The device 104 may endeavor to select, for presentation to the individuals 120 as suggested topics 116, a subset of topics 116 that are consistent with the details of the individual profiles 902. Additionally, in this scenario, none of the topics 116 is consistent with all of the topic group constraints 904 (e.g., because the individuals 102 are located in different areas of a region, no location 120 is within a short distance of all of the individuals 102). Therefore, the device 104 may calculate, for each topic 116, a suggested topic score 908 indicating a conformity of the topic 116 with the topic group constraints 904. Additionally, various topic group constraints 904 may be attributed different weights (e.g., a dietary restriction of a single individual 102, such as availability of gluten-free food options, may be a rigid constraint, while food preferences may be resolved by consensus). As another example, a consensus about locations 102 may be selected to minimize the collective travel time of all of the individuals 102, and/or to achieve an earliest meeting time, taking into account the different travel options available to each individual 102. The device 104 may then present the suggested topics 116 for the meeting to the individuals 102 as a topic group 602 with a map 118 presenting the location 120 of each topic 116, and optionally including a rating 910 for each topic 116 in the topic group 602 indicating an anticipated degree of consensus among the individuals 102, and/or sorting the topics 116 according to the respective ratings 910. In this manner, a device may provide a topic group 602 with a map 118 indicating the locations 120 of suggested topics 116 in accordance with the techniques presented herein.

E. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 10:
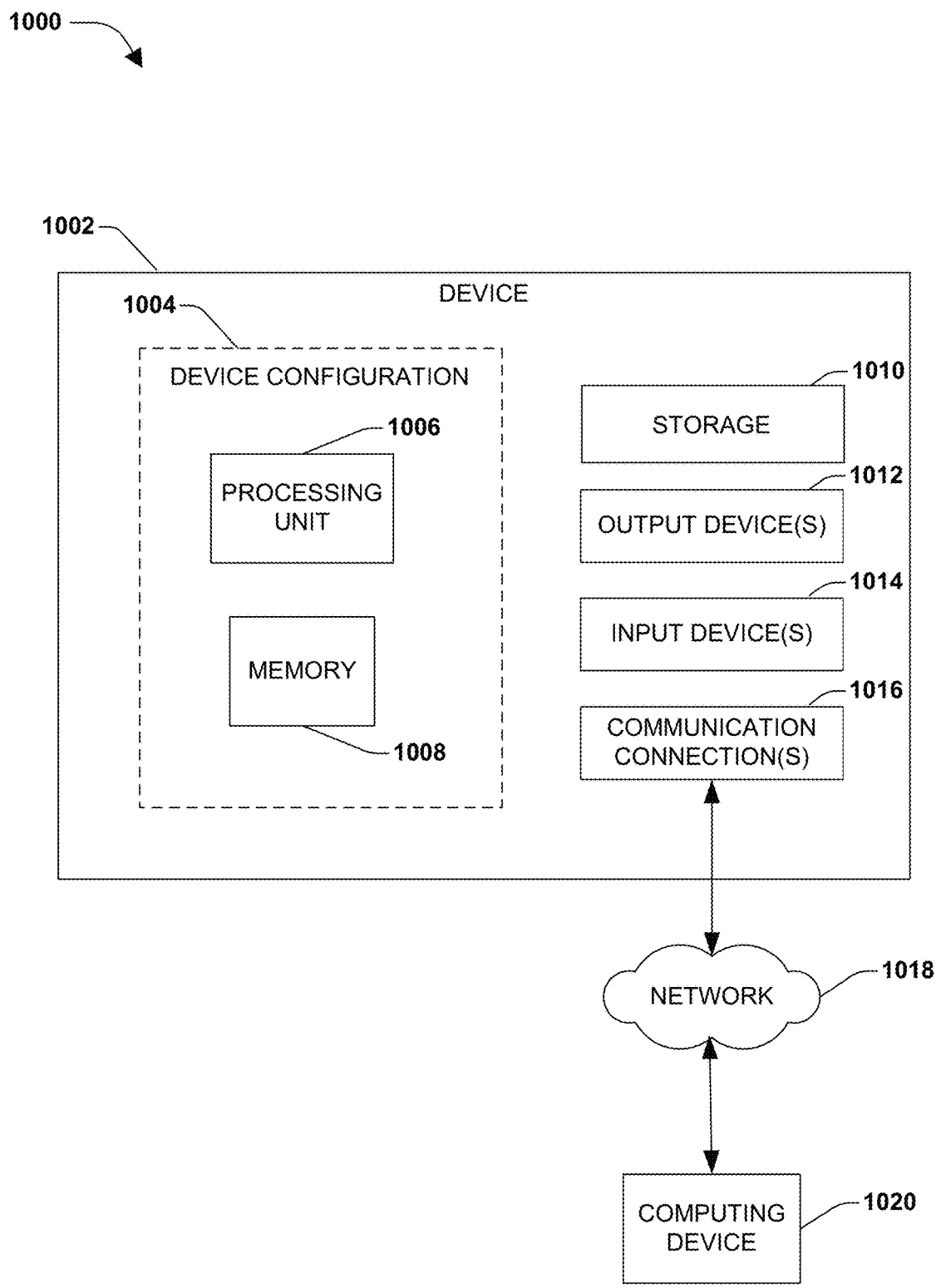
FIG. 10 is an illustration of an exemplary computing environment wherein a portion of the present techniques may be implemented and/or utilized.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

F. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of automatically facilitating a conversation among a first individual using a first device having a first processor and a first display and a second individual using a second device having a second processor and a second display, comprising:
   monitoring the conversation to automatically detect a topic referenced by the first individual, wherein the topic is detected by:
      identifying, using a natural language parser, a domain of the conversation;
      identifying, using the natural language parser, one or more entities referenced in the conversation; and
      identifying, using the natural language parser, an action associated with the conversation;
   determining, based at least in part, on the domain, the one or more entities and the action, a geographic location referenced in the conversation;
   upon detecting a reference to the geographic location:
      generating a route from a determined location of the first device to the geographical location; and
      automatically displaying, on the first display, a map including the generated route to the geographical location;
   determining, based at least in part, on one or more of the domain, the one or more entities and the action, whether the first individual has requested additional information about the geographic location; and
   upon detecting that the first individual has requested additional information:
   automatically performing a search for the additional information; and
   automatically removing the map and the generated route from the first display and displaying the additional information on the first display.

2. The method of claim 1, further comprising:
   upon detecting the topic, storing the topic in a conversation topic set;
   presenting, on the first display and the second display, a list comprising the conversation topic set; and
   upon receiving, from one of the first individual and the second individual, a selection of a topic in the list, presenting, on the map, an indicator representing a location of the selected topic.

3. The method of claim 2, further comprising:
   upon detecting a conversation end, storing the conversation topic set; and
   after the conversation end and upon receiving a request from an individual to present the conversation topic set, presenting, on the display, a list comprising the conversation topic set.

4. The method of claim 2, further comprising:
   upon receiving a request from one of the first individual and the second individual to alter the conversation topic set, altering the conversation topic set according to the request from one of the first individual and the second individual.

5. The method of claim 4, wherein:
   the request comprises removal of a selected topic from the conversation topic set; and
   after receiving the request for removal, removing the selected topic in the conversation topic set.

6. The method of claim 5, wherein, after receiving the request for removal:
   identifying an alternative topic; and
   suggesting the alternative topic to at least one individual of the conversation.

7. The method of claim 4, wherein:
at least one of the first individual and the second individual of the conversation comprises a conversation leader of the conversation; and
not altering the conversation topic set upon receiving, from an individual who is not the conversation leader, a request to alter the conversation topic set.

8. A system for automatically facilitating a conversation among a first individual and a second individual, comprising:
at least one processor; and
a memory coupled to the at least one processor and storing instructions that, when executed by the at least one processor, perform operations, comprising:
automatically monitoring the conversation to detect a topic in the conversation, wherein the topic is detected by:
identifying a domain of the conversation;
identifying one or more entities referenced in the conversation; and
identifying an action associated with the conversation;
determining, based at least in part, on the domain, the one or more entities and the action, a geographic location referenced in the conversation;
upon detecting a reference to the geographic location:
generating a route from a determined location of the first device to the geographical location; and
automatically displaying, on the first display, a map including the generated route to the geographical location;
determining, based at least in part, on one or more of the domain, the one or more entities and the action, whether the first individual has requested additional information about the geographic location; and
upon detecting that the first individual has requested additional information:
automatically performing a search for the additional information; and
automatically removing the map and the generated route from the first display and displaying the additional information on the first display.

9. The system of claim 8, further comprising instructions for:
identifying a topic group that is associated with the detected topic;
storing the detected topic in a conversation topic set associated with the identified topic group; and
presenting, on the first display, a list comprising:
the topic group; and
the topic associated with the topic group.

10. The system of claim 9, further comprising instructions for:
receiving a selection of the topic;
identifying at least one advertisement associated with the selected topic; and
presenting, on the first display, the advertisement associated with the selected topic.

11. The system of claim 9, further comprising instructions for:
identifying at least one suggested topic for the topic group; and
presenting the least one suggested topic to the first individual.

12. The system of claim 11, further comprising instructions for:
presenting, to the first individual associated with the first device, an option to present the suggested topic and the topic group; and
upon receiving, from the first individual, a selection of the option, presenting the at least one suggested topic to the first individual.

13. The system of claim 11, further comprising instructions for:
monitoring the conversation for at least one constraint; and
identifying at least one suggested topic that satisfies the at least one constraint.

14. The system of claim 13, further comprising instructions for:
calculating a suggestion score that is associated with the at least one constraint; and
presenting the at least two suggested topics sorted according to the suggestion score.

15. The system of claim 11, further comprising instructions for:
identifying at least one suggested topic for the topic group that is consistent with an individual profile of the first individual.

16. The system of claim 15, further comprising instructions for:
identifying at least one suggested topic for the topic group that is consistent with the individual profile of the first individual and a second individual profile of the second individual.

17. A computer-readable memory device storing instructions that, when executed by a processor of a computing device having a display, causes the computing device to automatically facilitate a conversation among at least two individuals by:
monitoring the conversation to automatically detect a topic referenced by a first individual, wherein the topic is detected by:
identifying, using a natural language parser, a domain of the conversation;
identifying, using the natural language parser, one or more entities referenced in the conversation; and
identifying, using the natural language parser, an action associated with the conversation;
determining, based at least in part, on the domain, the one or more entities and the action, a geographic location referenced in the conversation;
upon detecting a reference to the geographic location:
generating a route from a determined location of the first device to the geographical location; and
automatically displaying, on the first display, a map including the generated route to the geographical location;
determining, based at least in part, on one or more of the domain, the one or more entities and the action, whether the first individual has requested additional information about the geographic location;
and
upon detecting that the first individual has requested additional information:
automatically performing a search for the additional information; and
automatically removing the map and the generated route from the first display and displaying the additional information on the first display.

18. The method of claim 1, further comprising, displaying, on the first display, a set of actions associated with the topic.

19. The method of claim 1, further comprising, detecting that the topic has changed to a second topic during the conversation.

20. The method of claim 1, wherein the request for additional information is an indirect request for additional information.

\* \* \* \* \*